United States Patent
Su et al.

(10) Patent No.: US 9,888,423 B2
(45) Date of Patent: Feb. 6, 2018

(54) METHOD AND APPARATUS FOR FAST RETURN TO AN LTE NETWORK FROM A LEGACY NETWORK UTILIZING MULTIPLE RECEIVERS

(71) Applicant: Apple Inc., Cupertino, CA (US)

(72) Inventors: Li Su, San Jose, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 14/498,888

(22) Filed: Sep. 26, 2014

(65) Prior Publication Data

US 2015/0094065 A1    Apr. 2, 2015

Related U.S. Application Data

(60) Provisional application No. 61/884,885, filed on Sep. 30, 2013.

(51) Int. Cl.
*H04W 36/30* (2009.01)
*H04W 36/14* (2009.01)
*H04W 36/00* (2009.01)

(52) U.S. Cl.
CPC .......... *H04W 36/30* (2013.01); *H04W 36/14* (2013.01); *H04W 36/0022* (2013.01)

(58) Field of Classification Search
CPC . H04W 36/30; H04W 36/0022; H04W 36/00; H04W 36/06; H04W 36/14
See application file for complete search history.

(56) References Cited

U.S. PATENT DOCUMENTS

| | | |
|---|---|---|
| 8,195,166 B1 | 6/2012 | Oprescu-Surcobe et al. |
| 8,335,536 B2 | 12/2012 | Hirsch et al. |
| 8,737,355 B2 | 5/2014 | Kumpula et al. |
| 8,838,120 B2 | 9/2014 | Örjmark et al. |
| 8,989,145 B2 | 3/2015 | Das et al. |
| 8,995,370 B2 | 3/2015 | Pelletier et al. |
| 9,131,476 B2 | 9/2015 | Edara et al. |
| 9,220,055 B2 | 12/2015 | Shin |
| 9,456,437 B2 | 9/2016 | De Pasquale et al. |
| 2005/0085230 A1* | 4/2005 | Welnick ............ H04B 1/7113 455/437 |
| 2007/0237261 A1 | 10/2007 | Lindoff et al. |
| 2010/0234026 A1* | 9/2010 | Tenny ............... H04W 36/0061 455/436 |
| 2010/0279638 A1 | 11/2010 | Lindoff |
| 2011/0128919 A1 | 6/2011 | Kim et al. |
| 2012/0230268 A1 | 9/2012 | Marinier et al. |

(Continued)

*Primary Examiner* — Marcos Torres
(74) *Attorney, Agent, or Firm* — Downey Brand LLP

(57) ABSTRACT

Methods and apparatuses to use multiple receivers of a wireless communication device for fast return to a first network from a second network after termination of a Circuit Switched Fallback (CSFB) voice call is disclosed. A first receiver of the wireless communication device is used to process the CSFB voice call on the second network, while a second receiver of the wireless communication device is used to determine a strongest suitable cell available on the first network, while the voice call is active. A strongest suitable cell is instantly available to the wireless communication device after the CSFB voice call ends. In some embodiments, the first network is an LTE network, and the second network is a legacy network.

19 Claims, 9 Drawing Sheets

(56) References Cited

U.S. PATENT DOCUMENTS

| | | |
|---|---|---|
| 2013/0051362 A1 | 2/2013 | Lee et al. |
| 2013/0235740 A1* | 9/2013 | Kim ..................... H04W 24/04 370/252 |
| 2013/0324107 A1 | 12/2013 | Lindoff et al. |
| 2013/0331077 A1* | 12/2013 | Mucke ................. H04W 76/06 455/418 |
| 2014/0010207 A1 | 1/2014 | Horn et al. |
| 2014/0011501 A1 | 1/2014 | Mikami |
| 2014/0295912 A1* | 10/2014 | Lee ....................... H04W 88/06 455/552.1 |
| 2014/0315550 A1 | 10/2014 | Ganapathy et al. |
| 2015/0038137 A1 | 2/2015 | Varshney et al. |
| 2015/0092709 A1 | 4/2015 | Su |
| 2015/0333880 A1 | 11/2015 | Yi et al. |

* cited by examiner

METHOD AND APPARATUS FOR FAST RETURN TO AN LTE NETWORK FROM A LEGACY NETWORK UTILIZING MULTIPLE RECEIVERS

CROSS REFERENCE TO RELATED APPLICATIONS

This application claims the benefit of prior U.S. Provisional Application No. 61/884,885, filed Sep. 30, 2013 and entitled "FAST RETURN TO LTE FROM CSFB UTILIZING MULTIPLE RECEIVERS", which is incorporated by reference herein in its entirety for all purposes.

This application is related to concurrently filed U.S. patent application Ser. No. 14/498,879, entitled "METHOD AND APPARATUS FOR LTE CELL SEARCH USING MULTIPLE RECEIVERS OF A MOBILE DEVICE", which is incorporated by reference herein in its entirety for all purposes.

FIELD

The described embodiments relate generally to wireless communications and more particularly to fast return to Long Term Evolution (LTE) from circuit switched fallback (CSFB) utilizing multiple receivers.

BACKGROUND

An LTE network is a data packet only network. To support a voice call that does not use Voice over LTE (VoLTE), the LTE specification defines a circuit switched fallback (CSFB) mode in which a user equipment (UE) switches from an LTE mode to a legacy mode to originate or to receive a mobile originated (MO) or mobile terminated (MT) voice call and then switches back to the LTE network after the voice call is released. As an example, a legacy mode can include communication in accordance with a UMTS/CDMA/GSM (universal mobile telecommunications system/code division multiple access/global system for mobile communications) wireless communication protocol. Switching back to an LTE network is defined to follow a normal legacy network's (e.g., for a UMTS/CDMA/GSM network) call release procedure (e.g., perform a cell search after connection release). In this procedure, the LTE network is searched first for a suitable cell. If a suitable LTE cell is found, then the UE camps on the suitable LTE cell. Otherwise, the UE camps on a cell of a legacy network (e.g., UMTS/CDMA/GSM), and will reselect to an LTE cell when an LTE cell is found later using cell a re-selection procedure.

In general, cell selection after a voice call release should be as fast as possible, so that the UE can re-camp on a serving cell and start to listen to paging messages from the serving cell. Otherwise, a next paging message can be missed. Fast re-camp can occur, when the UE selects a cell that uses the same RAT (Radio Access Technology) as the just released voice call. This can most likely be the active cell on which the voice call occurred, or on one of a set of stronger neighbor cells that use the same RAT. With CSFB, after the voice call is released, the UE needs to search for cells of the LTE network first, and then for cells of the legacy network (e.g., UMTS/CDMA/GSM) on which the voice call occurred. This procedure can increase the re-camp time dramatically when the legacy network (NW) does not provide LTE cell information (or provides insufficient LTE cell information) in a RRC (Radio Resource Control) connection release message triggered by the voice call release. Most present network deployments do not provide LTE cell information in the RRC connection release message that triggers the voice call release, as UMTS/CDMA/GSM are established wireless networks.

A long re-camp time after release of a CSFB voice call can result in a poor user experience, as a user can expect to resume LTE service instantly after a voice call is released. Therefore, what is desired is a method of fast return to LTE from CSFB.

SUMMARY

Method and apparatus for fast return to an LTE network from a legacy network using multiple receivers of a wireless device is disclosed herein. A wireless device that includes at least two receivers can be used to process a voice call on the legacy network using one receiver and perform a cell search on an LTE wireless network simultaneously using another receiver for fast return to the LTE network after completion a CSFB procedure. The wireless device can switch from the LTE network to the legacy network and process the voice call in accordance with the CSFB procedure using the first receiver. Using the second receiver, the wireless device can determine, during the voice call, a strongest suitable LTE cell available for use by the wireless device in accordance with signal strength metrics and/or signal quality metrics. After releasing the voice call, the wireless device returns to the LTE network by camping on a strongest suitable LTE cell found during the voice call. In some embodiments, when no suitable LTE cell is found during the voice call, after the voice call ends, the wireless device searches concurrently for a predefined period of time on a legacy network to find a strongest suitable legacy cell using the first receiver and on the LTE network to find a strongest suitable LTE cell using the second receiver. The wireless device camps on the strongest suitable legacy cell when no suitable LTE cell is found. In some embodiments, the wireless device continues to search for the strongest suitable LTE cell using the second receiver while camped on the strongest suitable legacy cell of the legacy network.

The wireless device processes a voice call on a legacy wireless network using one receiver and performs a cell search on an LTE wireless network simultaneously using another receiver to accelerate returning to an LTE cell after a circuit-switched fallback (CSFB) procedure on the legacy wireless network ends. In some embodiments, multiple receivers of the wireless device are also used for fast selection of an cell on which to camp after an "initial power up," e.g., when powering on the wireless device, or when returning from an out-of-service (OOS) condition. A wireless device that includes at least two receivers can use one receiver to search over a first set of cells and use another receiver to search over a second set of cells in parallel. Furthermore, the wireless device uses one receiver to perform a search on cells associated with a first radio access technology (RAT) and uses another receiver to perform a search on cells associated with a second RAT. Thus, different receivers of the wireless device can perform searches for cells associated with different RATs concurrently.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
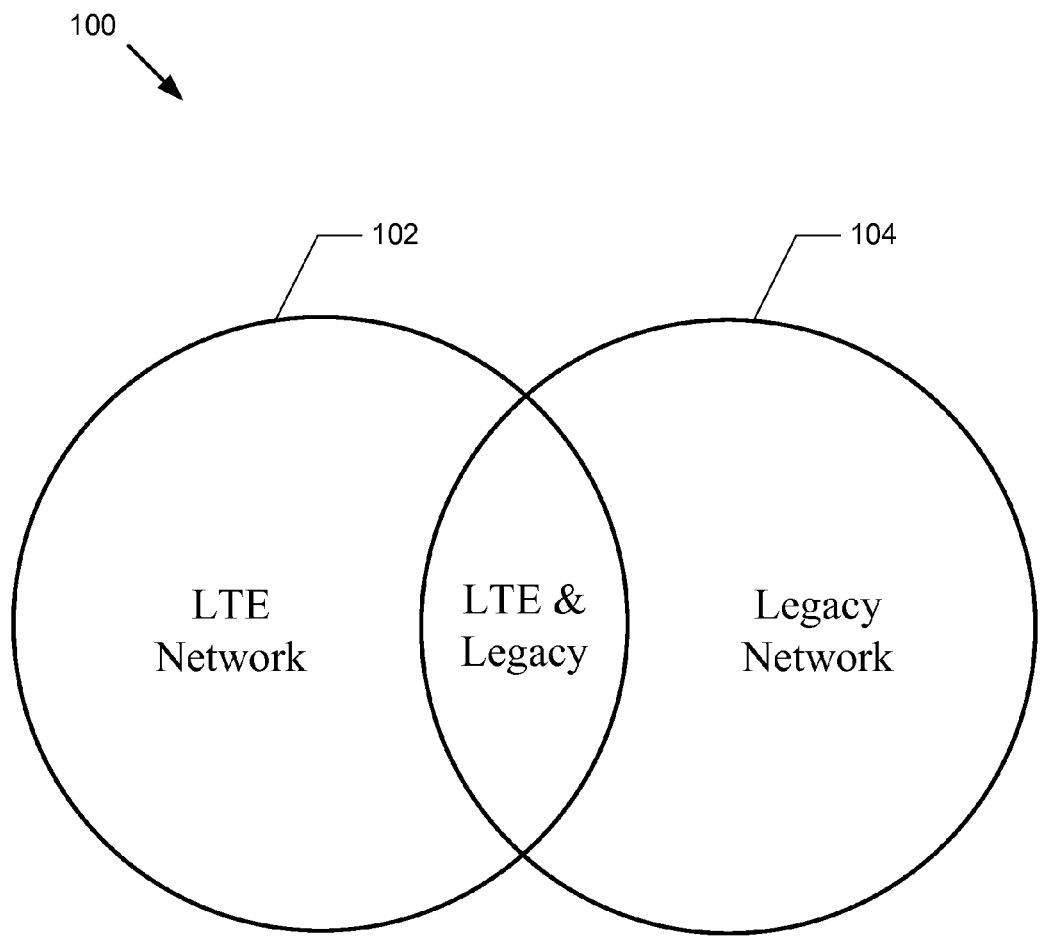
FIG. 1 illustrates overlapping coverage of an LTE network and a legacy network, in accordance with some embodiments.

Representative embodiments disclosed herein provide for methods and apparatuses to assist returning to a first network from a second network after a circuit switched fall back (CSFB) procedure. In some embodiments, the first network can be an LTE network, while the second network can be a legacy network such as a UMTS, CDMA, or GSM network. In some embodiments, a wireless communication device with two receivers can use one receiver to process a voice call using CSFB on the legacy network and use another receiver to determine a strongest suitable LTE cell available on an LTE network, while the voice call is still active. Using both receivers of the wireless communication device simultaneously allows for a fast return to the LTE network after the voice call on the legacy network is released. In general, a wireless communication device that is configured with two or more receivers can perform a fast return to the first network from the second network after performance of a CSFB procedure. One receiver of the wireless communication device can be used for servicing the CSFB call, while another one or more receivers can be used simultaneously to search for the strongest suitable cell available for use by the wireless communication device on the first network, during the voice call. Accordingly, a faster return to the LTE network following a CSFB procedure provides a better user experience due to quicker return to the LTE network and higher data rates available via the LTE network. It also provides a better overall user experience, because the user can expect an "instant" return to the first network after performance of a CSFB procedure.

In a first embodiment, a method for returning of a mobile wireless device to an LTE network from a legacy network is provided. The method can include switching from the LTE network to the legacy network in accordance with a circuit switched fall back (CSFB) procedure in order to process a voice call and establishing a connection on the legacy network using a first receiver and a transmitter of the mobile wireless device for processing the voice call. The method can further include determining, during the voice call, a strongest suitable LTE cell of the LTE network using a second receiver of the mobile wireless device based on one or more measured performance metrics. The one or more measured performance metrics include signal strength and signal quality metrics. The signal strength metrics includes a received signal strength indicator (RSSI), a received signal code power (RSCP), and a reference signal received power (RSRP). The signal quality metrics includes a signal to interference plus noise ratio (SINR) and a reference signal received quality (RSRQ). The method can further include returning to the LTE network by camping on the strongest suitable LTE cell found during the voice call.

In a second embodiment, a mobile station for returning to a LTE network from a CSFB procedure is provided. The mobile station can include a wireless circuitry comprising a first receiver, a second receiver, and a transmitter. The mobile station can further include a wireless processor coupled to the wireless circuitry and a storing medium for storing program code. Execution of the program by the wireless processor can cause the mobile station to switch from the LTE network to a legacy network in accordance with the CSFB procedure in order to process a voice call. Execution of the program by the wireless processor can further cause the mobile station to establish a connection on the legacy network using the first receiver and the transmitter for processing the voice call; determine, during the voice call, a strongest suitable LTE cell of the LTE network using a second receiver of the mobile station based on one or more measured performance metrics; and return to the LTE network by camping on the strongest suitable LTE cell found during the voice call, after releasing the voice call. In one embodiment, the wireless circuitry can include a third receiver. The mobile station can use the third receiver to search concurrently for the strongest suitable LTE cell of the LTE network during the voice call. In another embodiment, when no suitable LTE cell is found during the voice call, after releasing the voice call, execution of the program code by the wireless processor can further cause the mobile station to search concurrently, for a predefined period of time, on a set of legacy network cells using the first receiver to find a strongest suitable LTE cell; search concurrently, on a first set of LTE network cells using the second receiver and on a second set of LTE network cells using the third receiver to find the strongest suitable LTE cell; and return to the LTE network by camping on the strongest suitable LTE cell found during the predefined period of time. In yet another embodiment, when no suitable LTE cell is found during the predefined period of time, execution of the program code by the wireless processor can further cause the mobile station to camp on the strongest suitable legacy cell found during the predefined period of time and continue to search for the strongest suitable LTE cell using the second and third receivers.

In a third embodiment, a non-transitory machine-readable medium for storing instructions is provided. The instructions, when executed by one or more processors contained in a wireless user equipment (UE) can cause the UE to switch from the LTE network to the legacy network in accordance with a circuit switched fall back (CSFB) procedure in order to process a voice call and establish a connection on the legacy network using a first receiver and a transmitter for processing the voice call. The instructions, when executed by one or more processors contained in a UE can further cause the UE to determine, during the voice call, a strongest suitable LTE cell of the LTE network using a second receiver of the UE based on one or more measured performance metrics and return to the LTE network by camping on the strongest suitable LTE cell found during the voice call, after releasing the voice call. The one or more measured performance metrics include signal strength and signal quality metrics. The signal strength metrics comprises a received signal strength indicator (RSSI), a received signal code power (RSCP), and a reference signal received power (RSRP). The signal quality metrics comprises a signal to interference plus noise ratio (SINR) and a reference signal received quality (RSRQ). After releasing the voice call, further execution of the instruction by one or more processors, when no suitable LTE cell is found during the voice call, can cause the UE to search concurrently for a predefined period of time on a set of legacy network cells to find a strongest suitable legacy cell using the first receiver and on a set of LTE network cells to find the strongest suitable LTE cell using the second receiver; and return to the LTE network by camping on the strongest suitable LTE cell found during the predefined period of time.

In a fourth embodiment, a mobile device is provided. The mobile device can include a wireless circuitry comprising at least a first receiver, a second receiver, and a transmitter. The mobile device further can include one or more processors in communication with the wireless circuitry and a storage medium for storing program code. The program code when executed can cause the mobile device to search concurrently on a first set of cells associated with a first RAT using the first receiver, and on a second set of cells associated with a second RAT using the second receiver. The program code can further cause the mobile device to generate a list of candidate frequencies for cell acquisition and select a cell on which to camp using the list of candidate frequencies for cell acquisition. In some embodiments, the mobile device selects the cell on which to camp using the list of candidate frequencies and by obtaining at least one performance metric for each candidate frequency in the list of candidate frequencies. The mobile device selects the cell on which to camp based on a set of performance metrics obtained for the list of candidate frequencies. The performance metric includes a signal strength or a signal quality.

In a fifth embodiment, a method for fast LTE selection and reselection using at least two receivers in a wireless device is provided. The method can include concurrently searching on a first set of LTE cells using a first receiver of the wireless device and on a second set of LTE cells using a second receiver of the wireless device, where the second set of LTE cells differs from the first set of LTE cells. The method can further include generating a list of candidate frequencies for cell acquisition; and selecting an LTE cell on which to camp using the list of candidate frequencies for cell acquisition. In one embodiment, the list of candidate frequencies can be generated by obtaining at least one performance metric for each candidate frequency in the list of candidate frequencies and selecting the LTE cell on which to camp based on a set of performance metrics associated with the list of candidate frequencies. In some embodiment, when the wireless device includes a third receiver the method can further include concurrently searching on a third set of cells associated with a non-LTE RAT using the third receiver. The non-LTE RAT can include wideband code division multiple access (WCDMA), CDMA2000 1×, universal mobile telecommunication system (UMTS), and global system for mobile communications (GSM).

In a sixth embodiment, a non-transitory machine-readable medium for storing instructions is provided. The instructions, when executed by one or more processors of a wireless device can cause the wireless device to determine a received signal code power (RSCP) of a present serving LTE cell. And when the RSCP of the present serving cell falls below a first threshold and exceeds a second threshold, the instructions executed by the one or more processors can further cause the wireless device to perform a LTE inter-frequency cell detection and measurement procedure concurrently for a first set of LTE cells using a first receiver and for a second set of LTE cells using a second receiver, where the first set of LTE cells differs from the second set of LTE cells. Further, the instructions, when executed by one or more processors can cause the wireless device to select a new serving LTE cell based on LTE inter-frequency cell detection and measurement data obtained for the first set of LTE cells and the second set of LTE cells. In some embodiments, when the RSCP of the present serving LTE cell falls below the second threshold, the instructions, when executed by one or more processors can further cause the wireless device to perform concurrently the LTE inter-frequency cell detection and measurement for a first set of LTE cells using a first receiver and an inter-RAT (iRAT) inter-frequency cell detection and measurement for a second set of cells using a second receiver. The instructions, when executed by one or more processors can further cause the wireless device to select a new serving LTE cell based on LTE inter-frequency cell detection and measurement data obtained for the first set of LTE cells and iRAT inter-frequency cell detection and measurement data obtained for the second set of cells.

In a seventh embodiment, an apparatus is provided for fast LTE selection and reselection using at least two receivers. The apparatus can include means for concurrently searching on a first set of LTE cells using a first receiver of the wireless device and on a second set of LTE cells using a second receiver of the wireless device, where the second set of LTE cells differs from the first set of LTE cells. The apparatus can further include means for generating a list of candidate frequencies for cell acquisition; and means for selecting an LTE cell on which to camp using the list of candidate frequencies for cell acquisition.

As LTE is being deployed to more places around the world, a UE needs to support an increasing number of LTE frequency division duplexing (FDD) and time division duplexing (TDD) frequency bands. Frequency division duplexing requires pair frequency bands, one for uplink and one for downlink. Time division duplexing requires a single band as uplink and downlink are the same frequency. There are different LTE frequency band allocations for FDD and TDD. A UE detects whether a FDD or TDD transmission can be made on a given frequency band. There is a large number of frequency band allocations for FDD LTE use where the FDD LTE frequency bands are paired allowing for simultaneous transmission. Additionally, there are several unpaired frequency band allocations for TDD LTE use. With an increasing number of FDD and TDD LTE frequency bands, there is a need to speed up the LTE cell selection and reselection process.

LTE Release 10 introduced carrier aggregation (CA) to achieve wider bandwidth per UE. Carrier aggregation allows expansion of effective bandwidth delivered to a UE using concurrent utilization of multiple frequency bands with multiple carriers. Two or more component carriers (CCs) can be aggregated to form a large overall bandwidth up to 100 MHz. Carrier aggregation further allows for spectrum deployment of component carriers that are contiguous or non-contiguous. Carrier aggregation of contiguous CCs within the same operating frequency band, as defined for LTE, is called intra-band contiguous aggregation. Carrier aggregation of non-contiguous CCs that belong to the same frequency band with gap(s) in between the CCs are called intra-band non-contiguous aggregation. In inter-band, non-contiguous carrier aggregation the CCs belong to different frequency bands. Each aggregated carrier as a component carrier can have a frequency bandwidth of 1.4, 3, 5, 10, 15 or 20 MHz. Each component carrier is associated to a serving cell. Different component carriers can have different frequency bandwidths. In LTE release 10, a maximum of five component carriers can be aggregated. Each component carrier can be associated with an independent receiver (RX) path in a UE.

Carrier aggregation can be used in LTE connected mode for aggregating multiple frequency bands to increase downlink/uplink (DL/UL) data rates. Carrier aggregation cannot be used in an LTE idle mode. The LTE idle mode includes multiple procedures that happen during power-on and after power-on. The LTE idle mode procedures can be described as cell measurement, cell search, and cell selection/reselection procedures. Cell measurement procedure includes, for example, measuring signal quality and signal strength of neighbor cells. Cell search procedure includes, for example, determining which cell to camp on. Cell selection/reselection procedure, for example, includes determining a cell and changing cell from existing cell to another cell. Each of the idle mode procedures are complicated and time consuming. Therefore, what is desired is a method to speed up cell search and measurement, in LTE idle mode, by utilizing multiple receivers provided in a UE to support carrier aggregation. Additionally, what is desired is a method to speed up cell selection and reselection, in LTE idle mode, by utilizing multiple receivers provided in a UE to support carrier aggregation.

Some embodiments disclosed herein provide for a method to speed up LTE cell selection/reselection using multiple receivers, which can be provided in a wireless communication device for implementing carrier aggregation. Carrier aggregation can be used in LTE connected mode for aggregating multiple bandwidths to increase DL/UL data rate. Therefore, in idle mode, multiple receivers needed for carrier aggregation can be used for concurrent parallel searching of LTE cells during LTE cell selection/reselection. As an example, a first receiver and a second receiver of a UE can search for cells that use different carrier frequencies at the same time, so that the cell selection/reselection time is effectively reduced by a factor of ½, as compared to the case where only one receiver is used for searching. Some embodiments disclosed herein further provide for a method for fast selection of a cell to camp on after a CSFB voice call on a legacy system is released. Here, multiple receivers, which can be used for implementing carrier aggregation, are used to tune to different carrier frequencies, so that the UE can camp on a legacy network cell using a first receiver, while a second receiver continues to perform a cell search for a suitable LTE cell. Some embodiments disclosed herein also provide for a method for fast LTE and iRAT inter-frequency cell detection and measurement. Here, multiple receivers, which can be used for implementing carrier aggregation, are utilized to tune to different carrier frequencies for concurrent parallel processing of the cell detection and measurement, so that the cell detection and measurement processing time is effectively reduced.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

FIG. 1 illustrates overlapping coverage of an LTE network 102 and a legacy network 104 in a communications system 100 in accordance with some example embodiments. The LTE network 102 can, for example, be a fourth generation (4G) network based on an LTE wireless communication protocol, such as an LTE network or an LTE-Advanced (LTE-A) network, or other network that can offer faster data rates than legacy networks, such as second generation (2G) and third generation (3G) networks, but may not support circuit switched voice calls. It will be appreciated that the LTE network is illustrated by way of example, and not by way of limitation. In this regard, other wireless networks in existence now or that may be developed in the future that offer higher data rates but that do not support circuit switched (CS) voice calls can be substituted for the LTE network 102 within the scope of the disclosure. The legacy network 104 can be any legacy wireless network having a CS domain to support CS voice calls. By way of non-limiting example, the legacy wireless network 104 can be a 3G network, such as a wideband code division multiple access (WCDMA) or other universal mobile telecommunications system (UMTS) network, such as a time division synchronous code division multiple access (TD-SCDMA) network. As a further example, the legacy network 104 can be a CDMA2000 network, such as a 1×RTT network, or other network standardized by the Third Generation Partnership Project 2 (3GPP2) that supports a CS domain. As another example, the legacy network can be a 2G network such as a Global System for Mobile Communications (GSM) network.

The LTE network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the LTE network 102 and the legacy network 104. Thus, for example, when the wireless communication device is in a region of overlapping coverage, the wireless communication device can be connected to the LTE network 102 with an ongoing data session and can perform a CSFB procedure to the legacy network 104 in response to initiation of a circuit switched voice call.

Figure 2:
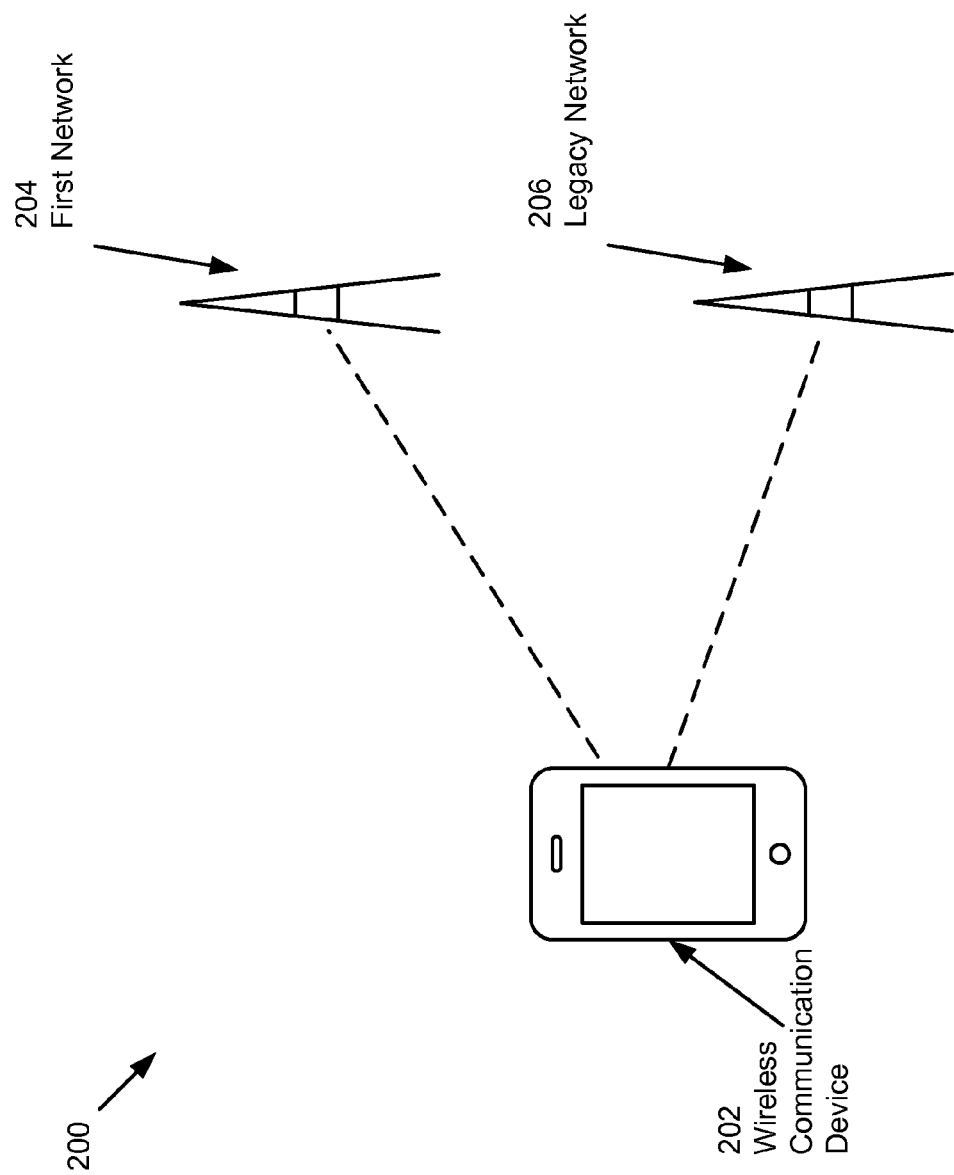
FIG. 2 illustrates an example system having multiple wireless communication networks to which a wireless communication device can connect, in accordance with some embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device; a tablet computing device; a laptop computing device; or other computing device configured to operate within both a first network 204 and a legacy network 206. The first network 204 can be any network supporting packet switched (PS) data sessions and offering higher theoretical data rates than the legacy network 206, but that does not support CS voice calls. Thus, for example, the first network 204 can be a network using an LTE standard (e.g., an LTE network, LTE-A network, or using another present or future developed LTE standard), such as the LTE network 102 illustrated in FIG. 1. The legacy network 206 can be any network having a CS domain to support CS voice calls. By way of non-limiting example, the legacy network 206 can be a UMTS network, a 3GPP2 CDMA2000 1× network, or other 3G network. As a further example, the legacy network 206 can be a GSM or other 2G network, or other legacy network that can support CS voice calls. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. As such, the wireless communication device 202 can connect to the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to the legacy network 206 so that the voice call can be supported. The CSFB procedure can, for example, be performed as defined in Technical Specification (TS) 23.272, the contents of which are disclosed herein by reference in its entirety. In some instances, the wireless communication device 202 can establish a data session over the first network 204 prior to performance of the CSFB procedure, and the data session can be moved to the legacy network 206 as a result of the CSFB procedure. Additionally or alternatively, in some instances, a data session can be established over the legacy network 206 subsequent to performance of the CSFB procedure. As the legacy network 206 can offer lower data rates than the first network 204, a data session moved to or established on the legacy network 206 as a result of a CSFB procedure can be impacted by lower data rates than would be supported if the data session were serviced by the first network 204 that can support higher data rates, e.g. an LTE NW.

Figure 3:
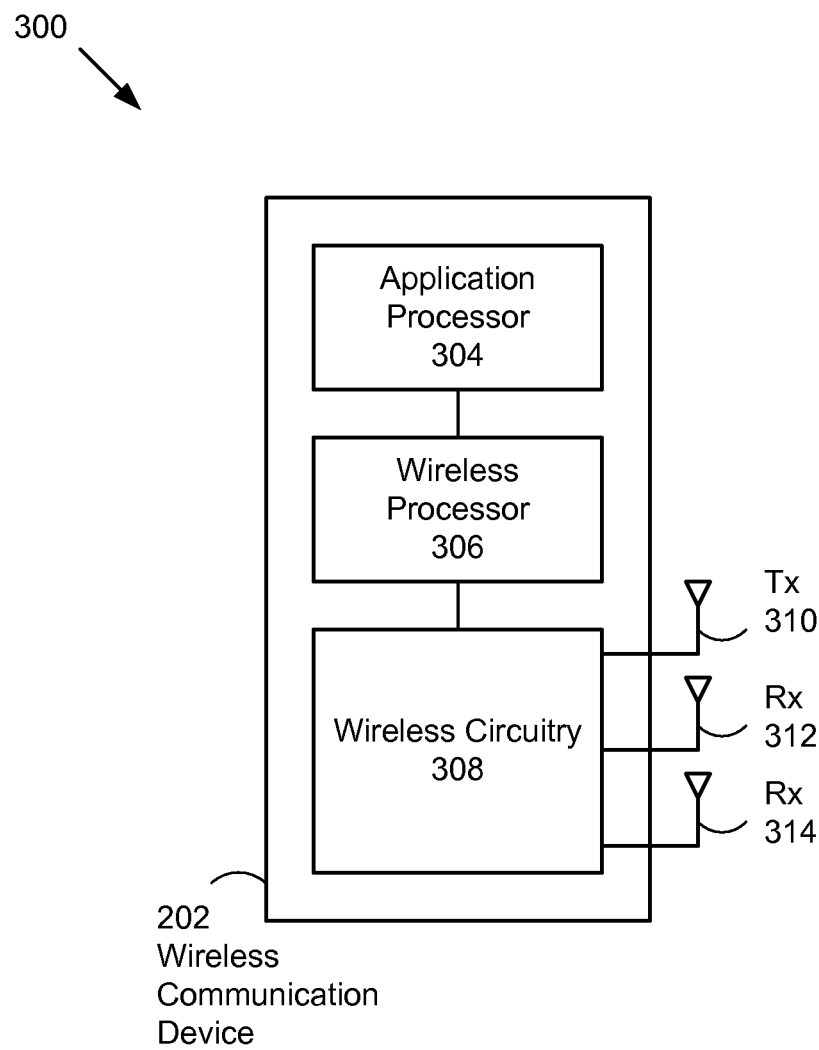
FIG. 3 illustrates select components of a wireless communication device with multiple receivers, in accordance with some embodiments.

FIG. 3 illustrates select components 300 of the wireless communication device 202 that can be used for processing radio frequency signals for transmission and reception by the wireless communication device 202. In particular, FIG. 3 illustrates select components 300 of the wireless communication device 202 that can be used to support carrier aggregation, such as LTE Release 10 carrier aggregation. The wireless communication device 202 can be used to support carrier aggregation, because it has at least two receivers 312 and 314.

LTE Release 10 introduced carrier aggregation (CA) to increase bandwidth per UE. Each aggregated radio frequency carrier, as a component carrier (CC), can have a bandwidth of 1.4, 3, 5, 10, 15 or 20 MHz. A maximum of five CCs can be aggregated. Each CC can be associated with an independent radio frequency (RF) receiver (RX) path having its own local oscillator (LO), which can be tuned to a different frequency from the frequency used for a serving CC associated with a primary serving cell. Each component carrier can be associated with a cell for an eNodeB. For minimum support of CA, a UE needs to support at least two CCs. As such, FIG. 3 shows a wireless communication device 202 with two receivers 312 and 314 that can support CA. CA is used only in an LTE connected mode for aggregating multiple bandwidths to increase DL/UL data rates. CA is not used in an LTE idle mode when cell selection/reselection takes place.

In FIG. 3, the wireless communication device 202 can include one or more processors and wireless circuitry that can cooperate together in establishing connections, interacting with application programs, formatting data in accordance with one or more wireless communication protocols, translating digital data into radio frequency signals suitable for transmission, and similarly converting received radio frequency signals into digital data. The wireless communication device 202 can include an application processor 304 that can request establishment of wireless connections to support communication for various applications running thereon. The wireless communication device 202 can also include a wireless processor 306 that can control the establishment and release of wireless connections to provide connectivity and communication for the wireless communication device 202 at least in part in response to request from the application processor 304. The wireless processor 306 can also provide for suitable formatting and in some embodiments modulation of data for transmission and demodulation of data for reception of radio frequency signals through wireless circuitry 308 included in the wireless communication device 202. The wireless circuitry 308 can be connected to one or more radio frequency transmit signal chains (including internal and/or external circuitry, e.g., antennas) 310 and two or more radio frequency receive signal chains (including internal and/or external circuitry, e.g., antennas) 312 and 314. In particular, the wireless circuitry 308 includes multiple radio frequency receive signal chains that can provide for carrier aggregation of radio frequency signals using multiple carriers simultaneously for communication between the wireless communication device 202 and multiple cells (radio sectors) connected to a common eNodeB (e.g., an evolved Node B, also referred to as an eNB). The wireless communication device 202 can configure the wireless processor 306 and wireless circuitry 308/310/312/314 to receive radio frequency signals from one or more radio sectors (cells) individually in series and/or collectively in parallel. In some embodiments, the wireless processor 306 can configure wireless circuitry 308/310/312/314 to receive radio frequency signals on a first set of frequencies from a set of serving cells and can re-configure the wireless circuitry 308/310/312/314 to receive radio frequency signals on a second set of frequencies from a set of inter-frequency neighbor cells and/or inter-RAT neighbor cells, e.g., during measurement gap time periods specified by the eNodeB to which the wireless communication device 202 can be connected through the serving cells during normal communication.

The wireless communication device 202 can include wireless circuitry that supports different wireless communication protocols and/or radio access technologies. In some embodiments, the wireless communication device 202 can include separate wireless circuitry for different wireless communication protocols and/or radio access technologies. In some embodiments, the wireless communication device 202 can include a combined, integrated block of wireless circuitry that can support a combination of different wireless communication protocols and/or different radio access technologies. The wireless circuitry 308 can include transmitters and receivers to provide signal processing of radio frequency wireless signals formatted according to one or more wireless communication protocols, e.g., GSM, UMTS, CDMA2000, LTE, and/or LTE-Advanced wireless communication protocols. In some embodiments, the wireless circuitry 308 can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

Figure 4:
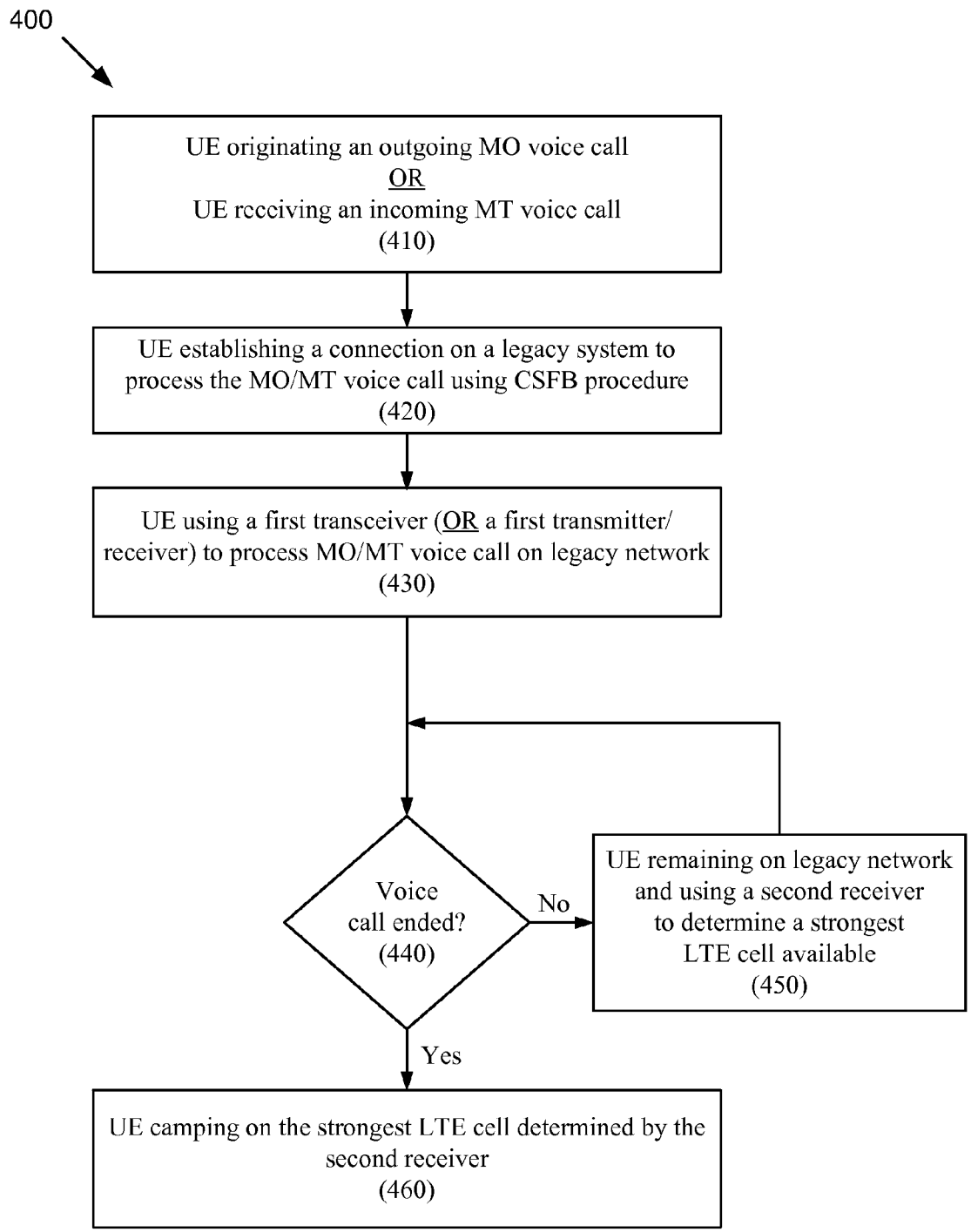
FIG. 4 illustrates a flowchart of a representative method for fast return to LTE from a CSFB procedure using multiple receivers of a wireless device, in accordance with some embodiments.

FIG. 4 illustrates a representative method 400 for fast return to LTE from CSFB utilizing multiple receivers in accordance with some embodiments. In a first step 410, a UE, such as the wireless communication device 202, can either originate a mobile originated (MO) call, or receive a paging indication on LTE NW (network) about an incoming voice mobile terminated (MT) call. Following a normal CSFB procedure, the UE switches to a legacy network, such as a UMTS/CDMA network, using its transmitter (TX) path to setup the MO/MT call. This is shown in step 420, where the UE (e.g., the wireless communication device 202) establishes a connection on a legacy network to process the MO/MT voice call using CSFB procedure. In step 430, the UE uses a first transceiver (or a first transmitter and a first receiver) to process MO/MT voice call on a legacy network. In some embodiments, the first transmitter 310 and the first receiver 312 of the wireless communication device 202 can be used to process MO/MT voice call on the legacy network. In step 440, the UE checks if the voice call has ended. If the voice call has not ended, the method proceeds to step 450, where the UE remains on the legacy network, using a second receiver to determine a strongest suitable LTE cell available. In some embodiments, when the UE is not static, the UE can use the second receiver to continually determine a strongest suitable LTE cell available for use by the UE. The strongest suitable LTE cell can be determined based on one or more signal strength metrics and/or signal quality metrics obtained for LTE cells found by the UE. In some embodiments, the UE can use the second receiver to determine the strongest suitable LTE cell available for use by the UE. An LTE cell can generally be determined to be a "strongest suitable" cell based on a combination of signal strength and/or signal quality, both of which can be network dependent and RAT dependent. In some embodiments, suitability of a cell can be determined based on a comparison of one or more performance metrics (e.g., signal strength and/or signal quality) to one or more thresholds. A "suitable" cell can satisfy a set of performance metrics, while a "strongest suitable" cell can be the "strongest" cell of a set of "suitable" cells that satisfy the set of performance metrics. Representative signal strength metrics include RSSI (received signal strength indicator), RSCP (received signal code power), and RSRP (reference signal received power). Representative signal quality metrics include SINR (signal to interference plus noise ratio), RSRQ (reference signal received quality), and other signal to noise metrics. In some embodiments, the second receiver 314 of the wireless communication device 202 can be used to determine a strongest suitable LTE cell available. In some embodiments, the UE uses the second receiver to determine a strongest suitable LTE cell available by utilizing the following steps: (1) monitor an LTE serving cell and search/measure neighboring cells in long DRX mode, and (2) reselect to a stronger LTE cell using an LTE re-selection procedure. In some embodiments, the standard selection/reselection criteria can be used for ranking the cells for selecting the best cell. When the voice call ends, the method proceeds to step 460, where the UE camps on the strongest suitable LTE cell available as determined by using the second receiver. In some embodiments, the UE camps on the strongest suitable LTE cell available as determined by using the second receiver by utilizing the following steps: (1) CS voice call is released on legacy network, and (2) UE switches both its transmitter (TX) path and receiver (RX) path on the legacy network back to an LTE cell being monitored by the second receiver, which should be the strongest suitable LTE cell available.

By implementing a method for fast return to LTE from CSFB utilizing multiple receivers, such as method 400 shown in FIG. 4, the improvement in re-camp time to LTE after CSFB voice call release can be quite dramatic. The re-camp time can possibly drop from 20 seconds (without implementation of method 400) to less than 1 second (with implementation of method 400). This is because, without implementation of method 400, searching for the strongest suitable LTE cell can take as long as 20 seconds. But, with implementation of method 400, the strongest suitable LTE cell is already available when the CSFB voice call is released, so the re-camp on the strongest suitable LTE cell can take less than 1 second. Power consumption attributed to the second receiver continually monitoring for a strongest suitable LTE cell available is small as compared to the power consumption for the concurrent voice call. Since the power drain on a voice call can be significant, the power consumption overhead for implementing method 400 can be almost negligible. Finally, when a wireless communication device is configured with more than two receivers, the third, fourth, and more receivers can be used together with the second receiver for determining a strongest suitable LTE cell available in parallel. By concurrently monitoring cells in parallel, the multiple receivers can speed up the LTE search process significantly. In some embodiments, the third, fourth, and more receivers can also be used to monitor for more than one Radio Access Technologies (RATs).

Figure 5:
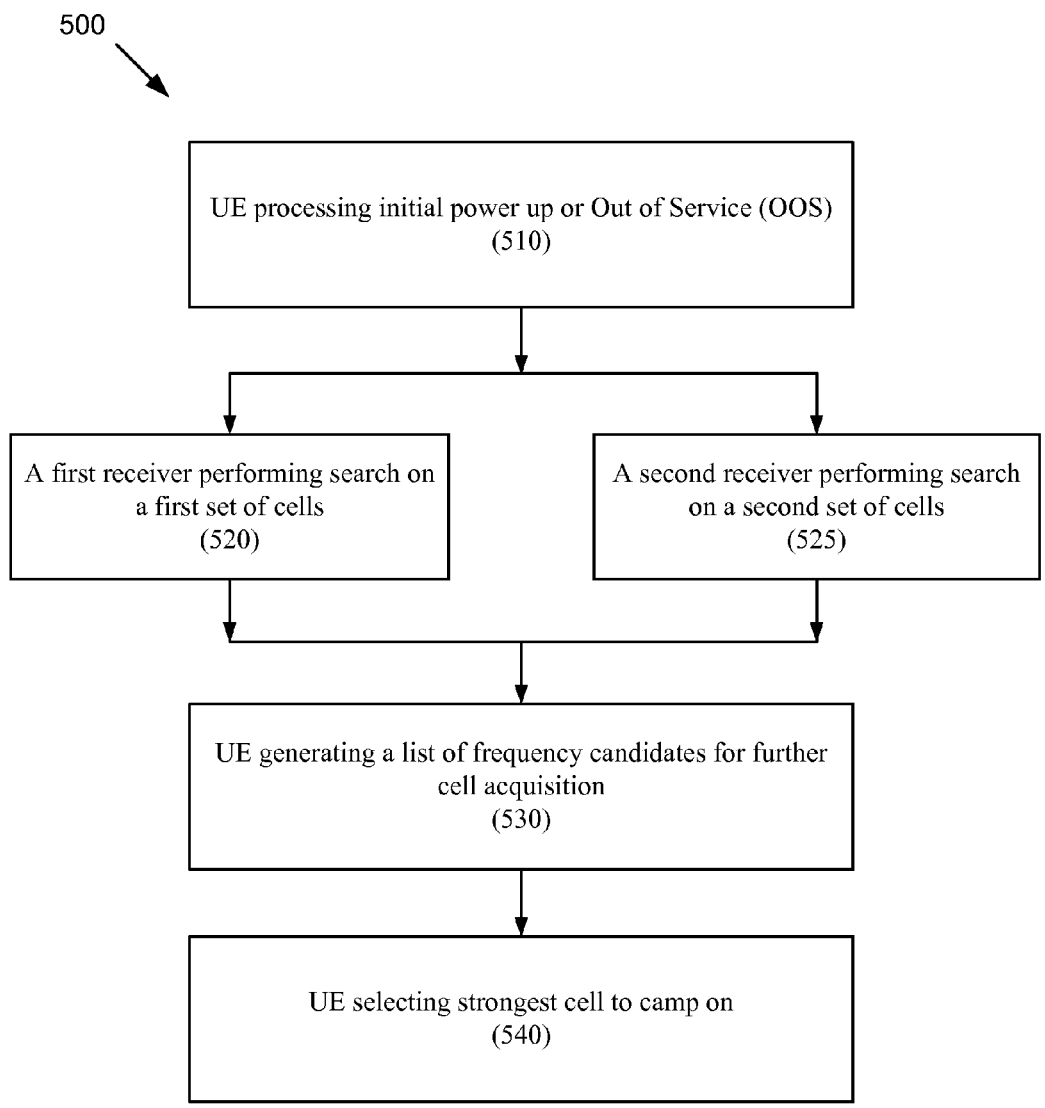
FIG. 5 illustrates a flowchart of a representative method for fast selection of a cell after an "initial power up" or when returning from an "out-of-service" condition, in accordance with some embodiments.

FIG. 5 illustrates a representative method 500 for fast selection of an LTE cell to camp on after "initial power up" or returning from an "Out of Service" (OOS) in accordance with some embodiments. During "initial power up" or returning from "Out of Service", to search for a strongest suitable cell on which to camp, all supported radio frequency bands need to be scanned to find a list of radio frequencies having a minimum 1.4 MHz bandwidth and a strong enough signal to support LTE communication. With LTE Release 10 carrier aggregation, each component carrier can tune to a different radio frequency with the same RF band or located in different RF bands at same time. For example, if two CCs are implemented, two RF sample streams, each from a different radio frequency, can be captured at same time. The same frequency scan algorithm usually used on one RF sample stream can be utilized on two RF sample streams at same time, effectively reducing frequency scan time by 50% to generate the same list of frequency candidates for cell acquisition.

For FIG. 5, in a first step 510, a UE, such as the wireless communication device 202, can process an "initial power up" or an "Out of Service" (OOS). In step 520, a first receiver of the UE can perform a search on a first set of cells. At the same time, in the step 525, a second receiver of the UE can perform a search on a second set of cells. The first receiver and the second receiver can search for cells using different radio frequencies, so that the cells belonging to the first and second sets can be different. In some embodiments, the first receiver 312 of the wireless communication device 202 can be used to search a first set of cells, while the second receiver 314 of the wireless communication device 202 can be used to search a second set of cells in parallel. In step 530, the UE can generate a list of frequency candidates for further cell acquisition. As the first receiver and the second receiver search for cells using different frequencies at the same time, the frequency scan time needed to generate a same list of frequency candidates for further cell acquisition is effectively reduced by a factor of ½, as compared to the case where only one receiver is used for searching. With LTE Release 10 carrier aggregation, up to 5 component carriers (CCs) can be aggregated, and a UE, such as the wireless communication device 202, can be configured to include as many as five receivers. In general, if N receivers are used to search for cells concurrently, the frequency scan time can be effectively reduced by a factor of 1/N. Finally, in step 540, the UE can select a strongest suitable cell to camp on, using the list of frequency candidates for further cell acquisition generated in previous step 530. The "strongest suitable" cell can be determined using representative signal strength and quality metrics previously described.

Figure 6:
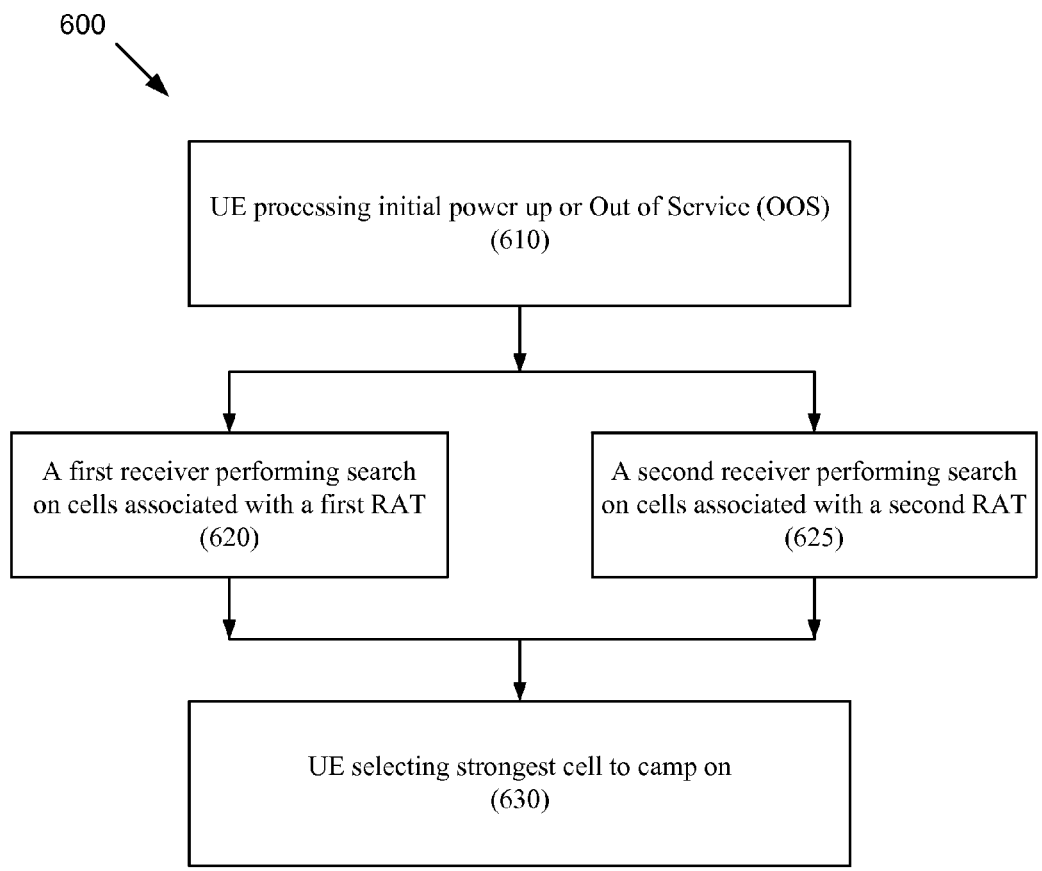
FIG. 6 illustrates a flowchart of a representative method for fast selection of a cell, from among several different radio access technologies, after an "initial power up" or when returning from an "out-of-service" condition, in accordance with some embodiments.

FIG. 6 illustrates a representative method 600 for fast selection of a cell (from among several different Radio Access Technologies) to camp on after "initial power up" or returning from an "Out of Service" (OOS) in accordance with some embodiments. In "initial power up" or "Out of Service" (OOS), the UE searches LTE, UMTS, GSM, CDMA2000 1×, and CDMA2000 EV-DO sequentially based on a RAT priority list defined by PLMN (public land mobile network). For example: LTE can be set to a highest priority, and UMTS can be set to a second priority. If an LTE search utilizing one receiver does not find any suitable LTE cell, the UE can utilize multiple receivers to tune to different RAT (e.g., UMTS, GSM, CDMA2000 1×, or CDMA2000 EV-DO) bands/frequencies at the same time to speed up the frequency scan for a strongest suitable cell across multiple RATs. The UE can split multiple receivers on different RATs. For example, with two receivers, the first receiver can tune to the LTE band, while the second receiver can tune to a UMTS band. This parallel search can be especially useful for scenarios where the high priority RAT is "Out of Service", but the lower priority RAT has suitable cell available. Additionally, while the UE is following a procedure to connect and/or operate on cells with a lower priority RAT, the UE can simultaneously look for cells with a higher priority RAT and switch to the higher priority RAT immediately if a strongest suitable cell should be located.

For FIG. 6, in a first step 610, a UE, such as the wireless communication device 202, can process an "initial power up" or an "Out of Service" (OOS). In step 620, a first receiver of the UE can perform a search on cells associated with a first RAT. At the same time, in the step 625, a second receiver of the UE can perform a search on cells associated with a second RAT. The first receiver and the second receiver can search for cells that use different RATs, so that a strongest suitable cell can be quickly found in the scenario where a high priority RAT is "Out of Service". In some embodiments, the first receiver 312 of the wireless communication device 202 can be used to search cells associated with a first RAT, while the second receiver 314 of the wireless communication device 202 can be used to search cells associated with a second RAT. In step 630, the UE can select the strongest suitable cell to camp on. As with LTE Release 10 carrier aggregation, where up to five component carriers (CCs) can be aggregated, a UE, such as the wireless communication device 202, can be configured to include as many as five receivers. In some embodiments, each receiver can be used to search for cells associated with a different RAT. In some embodiments, two or more receivers can be used to search for cells associated with the same RAT, which can speed up the frequency scan for that particular RAT. An optimal configuration of the parallel receivers can depend on the priorities of RAT, with more receivers dedicated to a higher priority RAT. Among RATs with the same priority, an optimal configuration of the parallel receivers can depend on the number of cells associated with each RAT, with more receivers dedicated to a RAT with a larger number of cells.

Figure 7:
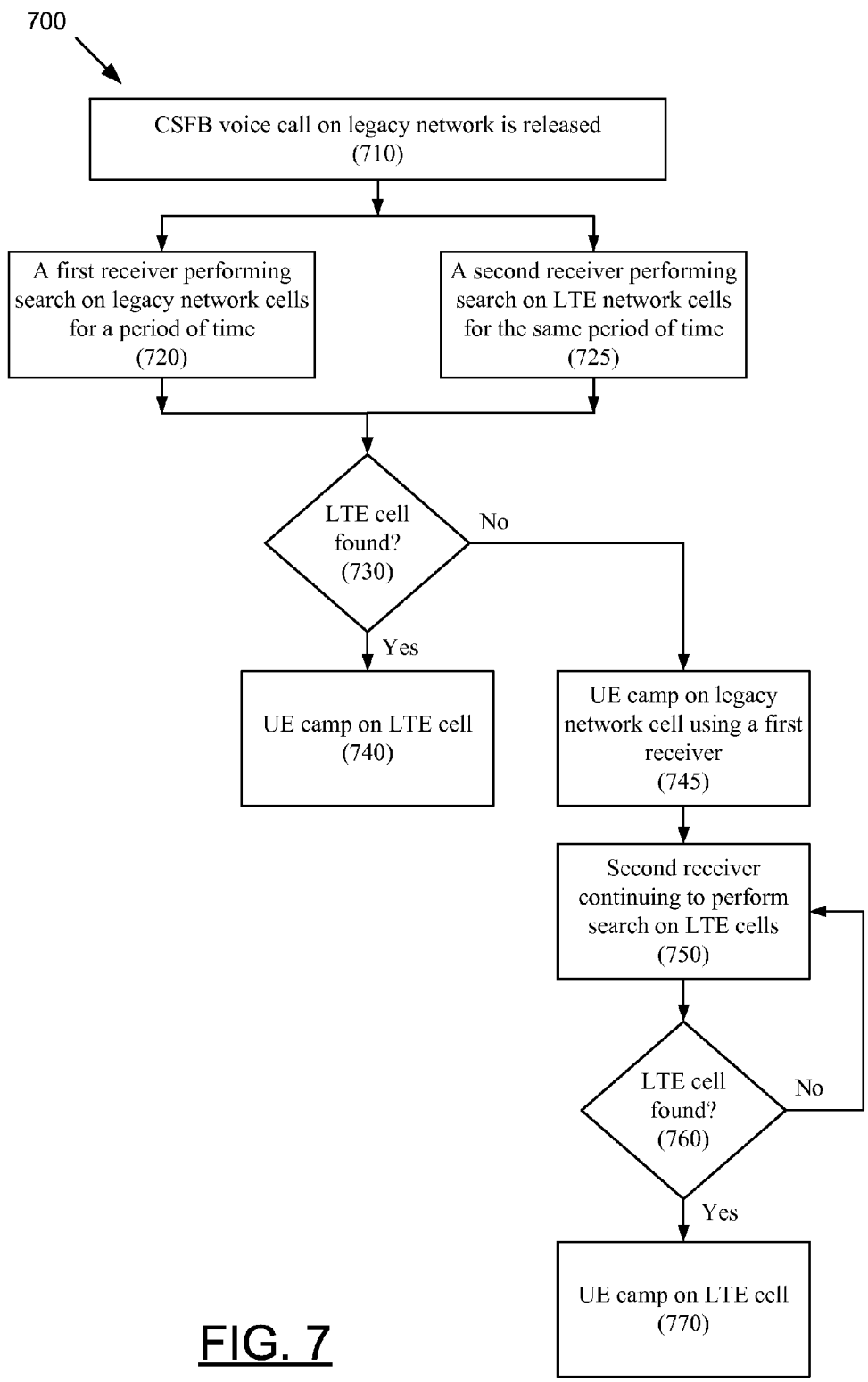
FIG. 7 illustrates a flowchart of a representative method for fast selection of a cell after release of a CSFB voice call on a legacy wireless network, in accordance with some embodiments.

FIG. 7 illustrates a representative method 700 for fast selection of a cell to camp on after a CSFB voice call on a legacy system is released in accordance with some embodiments. An LTE network is a packet data only network. To support a voice call that does not use VoLTE, the LTE specification defines a CSFB mode where, when a MO/MT voice call is initiated, the UE switches from the LTE network to a legacy 3G network, such as a CDMA2000 or UMTS network, for the voice call. After the voice call is released by the 3G network, using an existing 3G procedure for processing either (1) RRC connection release with re-direction, or (2) the UE performs a 3G to LTE reselection to return to the LTE network. There can be two problems associated with this CSFB mode. First, during a cell search that follows after an RRC connection release for a voice call, if the UE searches for an LTE cell first, and then searches for a cell of the 3G network (e.g., UMTS or CDMA2000 1×), then the return from the voice call can take a longer time to camp on the LTE cell if an LTE cell is found. With a long re-camp time, there is a greater chance that a following MT (mobile terminated) page can be missed. Second, as the UE is camped on the LTE network before the voice call, the user can expect that, after the CSFB voice call, the UE will return to the LTE network without much (if any) delay. The user can prefer not to find the UE camped on a 3G network for a period of time after the voice call, and then reselect back to the LTE network.

To solve the above 2 problems, multiple receivers available for implementing LTE Release 10 carrier aggregation can be utilized. When the CSFB voice call on the UMTS/CDMA2000 network (or other legacy 3G network) is released, a first receiver can be used for cell search on UMTS/CDMA after a normal RRC connection release, while a second receiver can be used for simultaneously searching of LTE cells from a set of stored LTE frequencies (in one RF band or spanning multiple RF bands) before the voice call is established. When an LTE cell is found after a defined period of time, the UE camps on the LTE cell instead of a 3G cell. Otherwise, the UE can camp on a 3G cell as with a normal voice call release. This reduces the probability of missing an MT page. In the meantime, while the UE is idle and camped on a UMTS/CDMA2000 network, the UE can continue to perform an LTE cell search on other frequencies/bands. As soon as a strongest suitable LTE cell is found, the UE can immediately reselect to an LTE cell.

An embodiment of the above solution is shown in FIG. 7. In a first step 710, a CSFB voice call ends, so the CSFB voice call on a legacy network is released. In step 720, a first receiver of the UE performs a search on a set of legacy network cells for a defined period of time. At the same time, in the step 725, a second receiver of the UE performs a search on a set of LTE network cells for the same defined period of time. In step 730, after the defined period of time, the UE determines whether a strongest suitable LTE cell is found. In step 740, when an LTE cell is found, the UE camps on the LTE cell. In step 745, when an LTE cell is not found, the UE camps on a legacy network cell using a first receiver. In step 750, a second receiver continues to perform a search on the set of LTE cells. In step 760, the UE determines whether a strongest suitable LTE cell is found. When an LTE cell is not found, the method returns to step 750, where the second receiver continues to perform a search on the set of LTE cells. When a strongest suitable LTE cell is found, the method proceeds to step 770, and the UE camps on the strongest suitable LTE cell.

Figure 8:
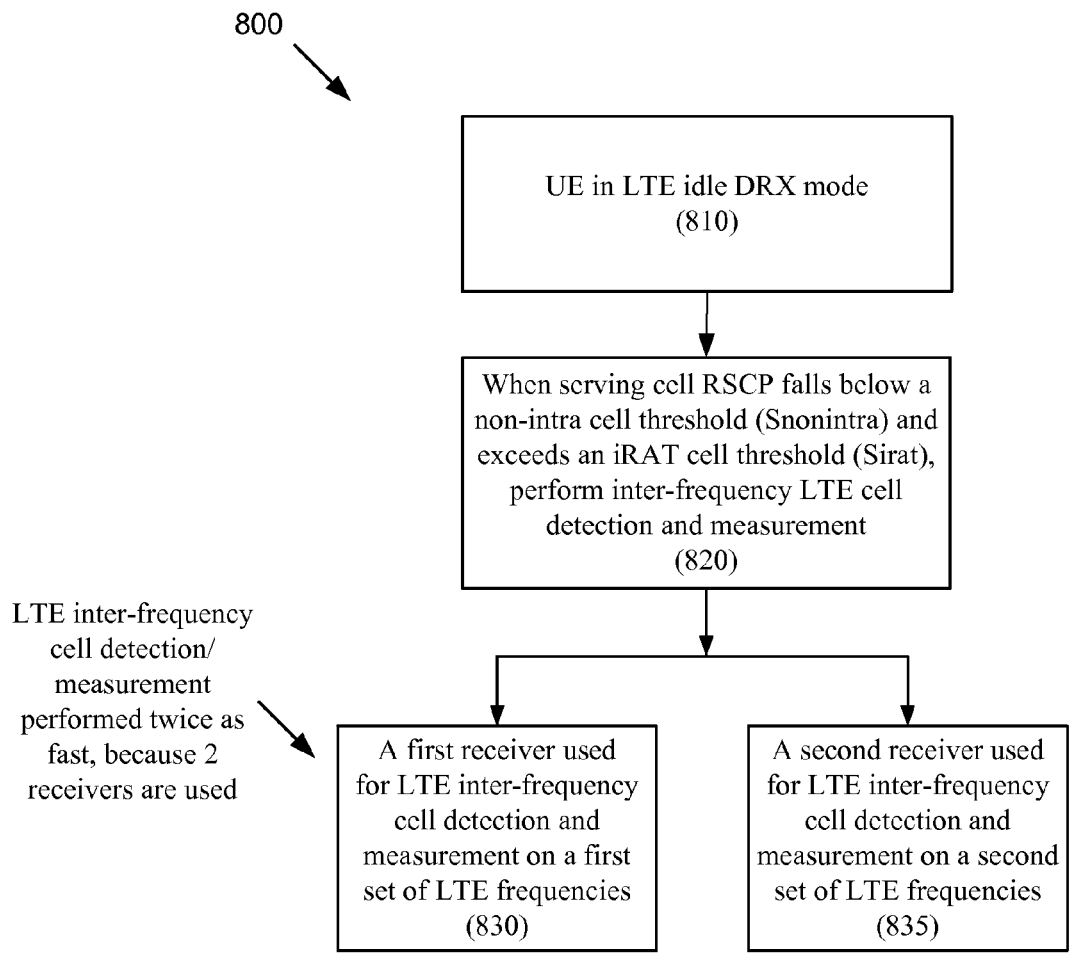
FIG. 8 illustrates a flowchart of a representative method for fast LTE inter-frequency cell detection and measurement for a UE operating in an idle Discontinuous Reception (DRX) mode, in accordance with some embodiments.
Figure 9:
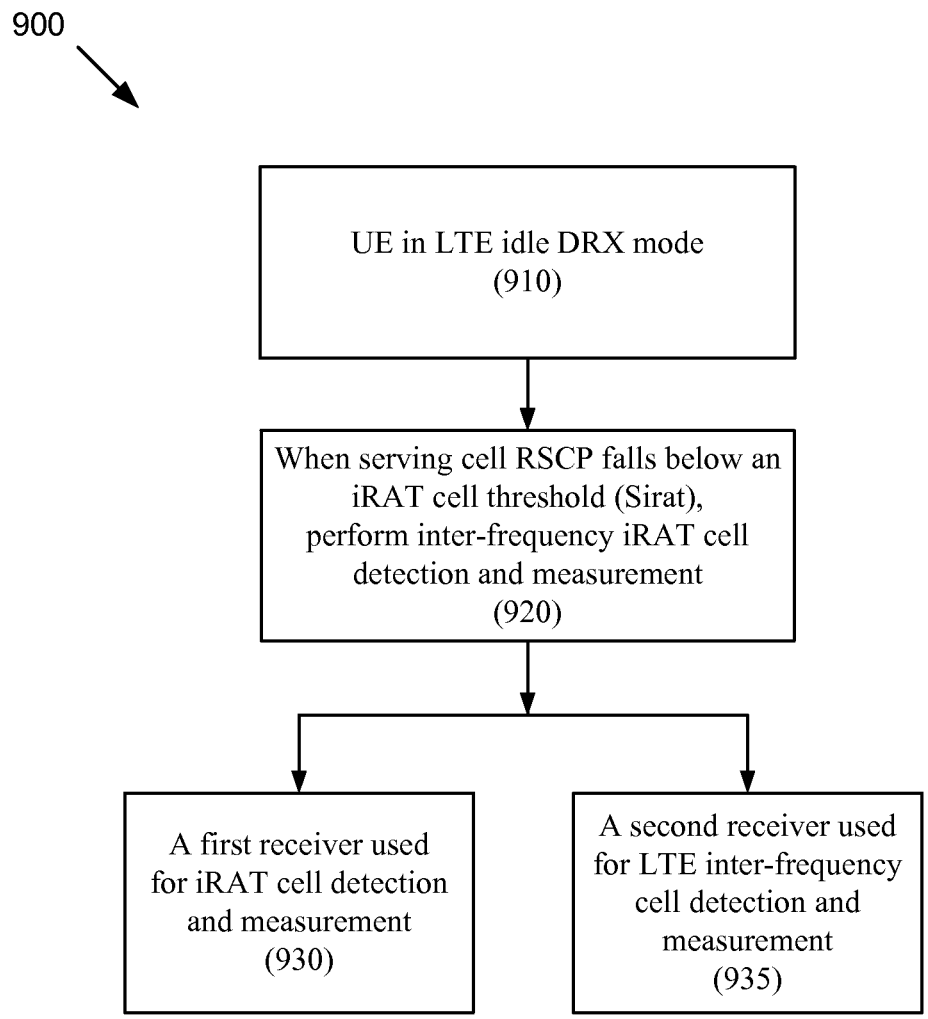
FIG. 9 illustrates a flowchart of a representative method for fast LTE inter-RAT, inter-frequency cell detection and measurement for a UE operating in an LTE idle DRX mode, in accordance with some embodiments.

FIGS. 8 and 9 illustrate representative methods for fast LTE and iRAT (inter-RAT) inter-frequency cell detection and measurement when a UE is in a LTE idle DRX mode in accordance with some embodiments. In LTE idle mode, DRX can be used for saving battery power. During LTE idle DRX mode, the UE can be paged but it does not have an active session. In LTE idle DRX mode, the UE listens only to one paging message during each DRX cycle by monitoring physical downlink control channel (PDCCH) for paging message at certain UE specific paging occasions (e.g., a specific subframe in a specific radio frame) according to DRX configuration. In LTE idle DRX mode, the UE can be required to detect and measure LTE cells across multiple LTE frequency bands, and UMTS/CDMA2000/DO/GSM iRAT (inter-RAT) cells across multiple frequency bands.

The 3rd Generation Partnership Project (3GPP) LTE specification defines a maximum eight frequencies for inter-frequency LTE and iRAT cells to detect and measure during an LTE idle mode. For a UE supporting LTE Release 10 carrier aggregation, multiple receivers (where N=number of receivers) can be utilized to speed up the LTE inter-frequency and inter-RAT cell detection and measurement, so that the UE wakeup time can be reduced to 1/N for the same period. Alternatively, N times more cell detection/measurement samples can be obtained during the same wakeup time.

For a UE with two receivers, there are two different representative scenarios. In a first representative scenario, when a serving cell signal strength falls below a first threshold, for example, when the serving cell RSCP falls below a non-intra frequency cell threshold (RCSP(S)<Snonintra), both receivers in the UE can be tuned to different LTE frequencies at same time, so inter-frequency cell detection and measurement can be simultaneously performed on two different LTE frequencies. In this scenario, S can represent a serving cell RSCP and Snonintra can represent a non-intra frequency cell threshold. In a second representative scenario, when a serving cell signal strength further falls below a second threshold, for example, serving cell RSCP further falls below an iRAT cell threshold (RSCP(S)<Sirat), a first receiver in the UE can be assigned to detect and measure iRAT cells, while a second receiver in the UE can be used for LTE inter-frequency cell detection and measurement. In this scenario, S can represent a serving cell RSCP and Sirat can represent an iRAT (inter-RAT) cell threshold. The assignment of receivers on each iRAT and LTE inter-frequency can be based on a network assigned iRAT and LTE frequency priority.

FIG. 8 illustrates a representative method 800 for fast LTE inter-frequency cell detection and measurement when a UE is in an LTE idle DRX mode in accordance with some embodiments. FIG. 8 corresponds to the first representative scenario for a UE with two receivers when a serving cell RSCP falls below a first threshold and exceeds a second threshold (e.g., when Sirat<RSCP(S)<Snonintra). In a first step 810, a UE is in an LTE idle DRX (Discontinuous Reception) mode. In step 820, when a serving cell RSCP falls below a LTE non-intra cell threshold (e.g., RSCP(S)<Snonintra) and exceeds an iRAT cell threshold (e.g., RSCP(S)>Sirat) the UE performs inter-frequency LTE cell detection and measurement. Next, in the step 830, a first receiver of the UE is used for LTE inter-frequency cell detection and measurement on a first set of LTE frequencies. At the same time, in the step 835, a second receiver of the UE is used for LTE inter-frequency cell detection and measurement on a second set of LTE frequencies different from the first set of LTE frequencies. The UE selects a serving LTE cell based on the LTE inter-frequency cell detection and measurement data for the first set and the second set of LTE frequencies. As the first receiver and the second receiver are tuned to different LTE frequencies at same time, the LTE inter-frequency cell detection and measurement can be performed twice as fast as when only one receiver is used. Similarly, if N receivers are used for detection and measurement concurrently, the detection and measurement time is effectively reduced by a factor of 1/N.

FIG. 9 illustrates a representative method 900 for fast LTE and iRAT (inter-RAT) inter-frequency cell detection and measurement when UE is in an LTE idle DRX mode in accordance with some embodiments. FIG. 9 corresponds to the second representative scenario for a UE with two receivers when a serving cell RSCP falls below the second threshold (e.g., RSCP(S)<Sirat). In a first step 910, a UE is in an LTE idle DRX mode. In step 920, when a serving cell RSCP falls below an iRAT cell threshold (Sirat), the UE performs inter-frequency iRAT cell detection and measurement. Next, in the step 930, a first receiver of the UE (e.g., the wireless communication device 202) can be used for iRAT cell detection and measurement. At the same time, in the step 935, a second receiver of the UE (e.g., the wireless communication device 202) can be used for LTE inter-frequency cell detection and measurement. The UE can select a serving cell based on LTE inter-frequency cell detection and measurement and the iRAT cell detection and measurement data. As the iRAT and LTE inter-frequency cell detection and measurement are performed in parallel concurrently, the total detection and measurement time is accordingly reduced.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code and/or instructions on a non-transitory computer-readable medium. The non-transitory computer-readable medium is any data storage device that can store data that can thereafter be read by a computer system. Examples of the non-transitory computer-readable medium include read-only memory, random-access memory, CD-ROMs, DVDs, magnetic tape and optical data storage devices. The computer program code and/or instructions can also be distributed over network-coupled computer systems so that the computer program code and/or instructions are stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for returning to a long term evolution (LTE) network from a legacy network, the method comprising:
   in a mobile wireless device comprising a single transmitter to communicate with one wireless network at a time and a plurality of receivers:
   switching from the LTE network to the legacy network as part of executing a circuit switched fall back (CSFB) procedure in order to process a voice call via the legacy network;
   establishing a connection on the legacy network using a first receiver of the plurality of receivers and the single transmitter of the mobile wireless device for processing the voice call;
   during the voice call while the mobile wireless device is connected to the legacy network, and using a second receiver of the plurality of receivers:
   searching for LTE cells of the LTE network and measuring any LTE cells found to determine suitability for LTE communication;
   when finding at least one suitable LTE cell:
   determining a strongest suitable LTE cell of the LTE network based on one or more measured performance metrics; and
   selecting the determined strongest suitable LTE cell as a cell on which the mobile wireless device camps upon release of the voice call, and
   after releasing the voice call, returning to the LTE network by camping on the strongest suitable LTE cell selected during the voice call.

2. The method of claim 1, further comprising:
   when no suitable LTE cell is found during the voice call, after releasing the voice call:
   searching for and measuring concurrently, for a predefined period of time, on a set of legacy network cells to find suitable legacy cells using the first receiver and on a set of LTE network cells to find suitable LTE cells using the second receiver; and
   when finding at least one suitable LTE cell during the predefined period of time, returning to the LTE network by camping on a strongest suitable LTE cell of suitable LTE cells found during the predefined period of time.

3. The method of claim 2, further comprising:
   when no suitable LTE cell and at least one suitable legacy cell is found during the predefined period of time, camping on a strongest suitable legacy cell of suitable legacy cells found during the predefined period of time; and
   continuing to search for and measure suitable LTE cells using the second receiver while camped on the strongest suitable legacy cell.

4. The method of claim 1, wherein the one or more measured performance metrics comprise one or more of: a received signal strength indicator (RSSI), a received signal code power (RSCP), or a reference signal received power (RSRP).

5. The method of claim 1, wherein the one or more measured performance metrics comprise one or more of: a signal to interference plus noise ratio (SINR) or a reference signal received quality (RSRQ).

6. The method of claim 1, further comprising:
determining whether the mobile wireless device is static or not static; and
while the mobile wireless device is not static, searching for LTE cells of the LTE network and measuring any LTE cells found to determine suitability for LTE communication using the second receiver.

7. The method of claim 1, wherein the mobile wireless device switches from the LTE network to the legacy network as part of executing the CSFB procedure to process a mobile originated (MO) voice call or an incoming mobile terminated (MT) voice call.

8. The method of claim 1, wherein the legacy network is one or more of: a global system for mobile communications (GSM) network, a universal mobile telecommunications system (UMTS) network, or a code division multiple access (CDMA) network.

9. The method of claim 1, wherein the mobile wireless device includes a third receiver, the method further comprising:
during the voice call, using the third receiver concurrently with the second receiver to search for LTE cells and measure any LTE cells found to determine suitability for LTE communication.

10. A mobile station configurable for returning to a Long Term Evolution (LTE) network from a legacy network, the mobile station comprising:
wireless circuitry comprising a single transmitter to communicate with one wireless network at a time, a first receiver, and a second receiver;
a wireless processor communicatively coupled to the wireless circuitry; and
a storing medium for storing program code that, when executed by the wireless processor, causes the mobile station to:
switch from the LTE network to the legacy network as part of executing a circuit switched fallback (CSFB) procedure in order to process a voice call via the legacy network;
establish a connection on the legacy network using the first receiver and the single transmitter for processing the voice call;
during the voice call while the mobile station is connected to the legacy network and using the second receiver:
search for LTE cells of the LTE network and measure any LTE cells found to determine suitability for LTE communication;
when finding at least one suitable LTE cell:
determine a strongest suitable LTE cell of the LTE network based on one or more measured performance metrics; and
select the determined strongest suitable LTE cell as a cell on which the mobile station camps upon release of the voice call, and
after release of the voice call, return to the LTE network by camping on the strongest suitable LTE cell selected during the voice call.

11. The mobile station of claim 10, wherein the wireless circuitry further includes a third receiver used concurrently with the second receiver by the mobile station, during the voice call, to search for LTE cells and measure any LTE cells found to determine suitability for LTE communication.

12. The mobile station of claim 11, wherein execution of the program code by the wireless processor, further causes the mobile station to:
when no suitable LTE cell is found during the voice call, after releasing the voice call:
search for and measure concurrently, for a predefined period of time, on a set of legacy network cells using the first receiver to find suitable legacy cells and on a first set of LTE network cells using the second receiver and on a second set of LTE network cells using the third receiver to find suitable LTE cells; and
when finding at least one suitable LTE cell during the predefined period of time, return to the LTE network by camping on a strongest suitable LTE cell of suitable LTE cells found during the predefined period of time.

13. The mobile station of claim 12, wherein execution of the program code by the wireless processor, further causes the mobile station to:
when no suitable LTE cell and at least one suitable legacy cell is found during the predefined period of time, camp on a strongest suitable legacy cell of suitable legacy cells found during the predefined period of time; and
continue to search for and measure suitable LTE cells using the second and third receivers while camped on the strongest suitable legacy cell.

14. The mobile station of claim 10, wherein the one or more measured performance metrics comprise one or more of: an RSSI, an RSCP, or an RSRP.

15. The mobile station of claim 10, wherein one or more measured performance metrics comprise one or more of: an SINR or an RSRQ.

16. The mobile station of claim 10, wherein the first receiver and the second receiver are configurable for carrier aggregation.

17. A non-transitory machine-readable medium storing instructions for returning a wireless user equipment (UE) to a Long Term Evolution (LTE) network from a legacy network, wherein execution of the instructions by one or more processors contained in the UE causes the UE to at least:
switch from the LTE network to the legacy network as part of executing a circuit switched fall back (CSFB) procedure in order to process a voice call via the legacy network;
establish a connection on the legacy network using a first receiver and a single transmitter of the UE for processing the voice call;
during the voice call while the wireless UE is connected to the legacy network and using a second receiver of the UE:
search for LTE cells of the LTE network and measure any LTE cells found to determine suitability for LTE communication;
when finding at least one suitable LTE cell:
determine a strongest suitable LTE cell of the LTE network based on one or more measured performance metrics; and
select the determined strongest suitable LTE cell as a cell on which the wireless UE camps upon release of the voice call, and
after release of the voice call, return to the LTE network by camping on the strongest suitable LTE cell selected during the voice call,
wherein the UE comprises the single transmitter only to communicate with one wireless network at a time.

18. The non-transitory machine-readable medium of claim 17, wherein execution of the instructions by the one or more processors contained in the UE further causes the UE to:
- when no suitable LTE cell is found during the voice call, after releasing the voice call:
  - search for and measure concurrently, for a predefined period of time, on a set of legacy network cells to find suitable legacy cells using the first receiver and on a set of LTE network cells to find suitable LTE cells using the second receiver; and
  - when finding at least one suitable LTE cell during the predetermined period of time, return to the LTE network by camping on a strongest suitable LTE cell of suitable LTE cells found during the predefined period of time.

19. The non-transitory machine-readable medium of claim 17, wherein the one or more measured performance metrics comprise one or more of: an RSSI, an RSCP, an RSRP, an SINR, or an RSRQ.

* * * * *